(12) United States Patent
Rouleau et al.

(10) Patent No.: US 8,936,221 B2
(45) Date of Patent: Jan. 20, 2015

(54) METAL WALL BRACKET

(75) Inventors: Rodney G. Rouleau, Manhattan, IL (US); James Banaszak, Mokena, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 13/551,695

(22) Filed: Jul. 18, 2012

(65) Prior Publication Data

US 2014/0021309 A1    Jan. 23, 2014

(51) Int. Cl.
*H02G 3/30*    (2006.01)

(52) U.S. Cl.
USPC ............................. 248/73; 248/74.3; 248/68.1

(58) Field of Classification Search
CPC ............. F16L 3/23; F16L 3/233; F16L 3/223; F16L 3/04; F16L 3/26; F16L 3/137; H02G 3/30
USPC .............. 248/68.1, 74.3, 58, 70, 69, 73, 74.1, 248/74.2, 74.4, 220.21, 220.41, 223.21, 248/223.41, 224.8, 298.1
See application file for complete search history.

(56) References Cited

U.S. PATENT DOCUMENTS

| | | | |
|---|---|---|---|
| 2,384,158 A | 9/1945 | Carpenter et al. | |
| 3,087,700 A | 4/1963 | Carpenter et al. | |
| 3,632,069 A * | 1/1972 | Thayer et al. | 248/56 |
| 3,632,071 A * | 1/1972 | Cameron et al. | 248/74.3 |
| 3,633,857 A * | 1/1972 | Logan | 248/62 |
| 4,013,253 A | 3/1977 | Perrault et al. | |
| 4,395,009 A * | 7/1983 | Bormke | 248/68.1 |
| 4,899,963 A * | 2/1990 | Murphy | 248/65 |
| 4,907,766 A | 3/1990 | Rinderer | |
| 4,960,253 A | 10/1990 | Perrault et al. | |
| 5,160,107 A | 11/1992 | Perrault et al. | |
| 5,386,615 A * | 2/1995 | Bernard | 24/16 PB |
| D368,648 S | 4/1996 | Losier | |
| 5,503,354 A | 4/1996 | Lohf et al. | |
| 5,632,457 A | 5/1997 | Neely, Jr. | |
| 5,653,409 A * | 8/1997 | White et al. | 248/73 |
| 5,876,000 A | 3/1999 | Ismert | |
| 5,934,633 A * | 8/1999 | Padiak et al. | 248/228.8 |
| 6,082,690 A | 7/2000 | Durin et al. | |
| 6,367,753 B1 * | 4/2002 | Berg | 248/222.11 |
| 6,412,733 B1 | 7/2002 | Grzemski | |
| 6,446,914 B1 | 9/2002 | Laberis | |
| 6,533,226 B2 * | 3/2003 | Geiger | 248/74.3 |
| 6,631,874 B2 | 10/2003 | Turpin et al. | |
| 7,083,152 B2 * | 8/2006 | Carullo et al. | 248/65 |
| 7,134,633 B2 * | 11/2006 | Logan | 248/74.3 |
| 7,150,437 B1 * | 12/2006 | Teeters | 248/70 |

(Continued)

FOREIGN PATENT DOCUMENTS

| | | | | |
|---|---|---|---|---|
| EP | 813012 A1 * | 12/1997 | | F16L 3/26 |
| EP | 1261093 A1 * | 11/2002 | | H02G 3/32 |

(Continued)

*Primary Examiner* — Terrell McKinnon
*Assistant Examiner* — Eret McNichols
(74) *Attorney, Agent, or Firm* — Christopher S. Clancy; Aimee E. McVady (57) ABSTRACT

The present invention is directed to a wall bracket that mounts bundles to a wall. The wall bracket includes a bundle side member and a wall side member that engages the bundle side member. The bundle side member has a plurality of slots for receiving a locking tie. The wall side member having a plurality of pockets aligned with the plurality of slots. The plurality of pockets guide the locking tie when installed in the slots to secure the bundle on the wall bracket.

4 Claims, 9 Drawing Sheets

(56) References Cited

U.S. PATENT DOCUMENTS

| | | | |
|---|---|---|---|
| 7,600,724 B2 | 10/2009 | Nelson et al. | |
| 8,141,825 B2 * | 3/2012 | Logan et al. | 248/74.3 |
| 2008/0078890 A1 * | 4/2008 | Nelson et al. | 248/73 |
| 2010/0288554 A1 | 11/2010 | Jafari | |
| 2013/0105639 A1 * | 5/2013 | Chirpich et al. | 248/73 |

FOREIGN PATENT DOCUMENTS

| | | | | |
|---|---|---|---|---|
| EP | 1475871 B1 | 11/2004 | | |
| EP | 1770840 A1 * | 4/2007 | | H02G 3/26 |
| FR | 2836979 A1 | 9/2003 | | |
| FR | 2841057 A1 * | 12/2003 | | H02G 3/04 |
| WO | 2005106304 A1 | 11/2005 | | |

* cited by examiner

METAL WALL BRACKET

FIELD OF THE INVENTION

The present invention relates to a metal wall bracket, and more particularly, to a metal wall bracket for mounting bundles with metal locking ties.

BACKGROUND OF THE INVENTION

Mounting brackets are often secured to a variety of structures for receiving and carrying items, such as electrical equipment and cable bundles. Some supports and mounting brackets suffer from an inability to provide adequate vertical support or horizontal support. Some supports and mounting brackets are unable to support heavy loads. Mounting brackets also suffer from requiring a multiplicity of parts and an inability to achieve quick installation.

Thus, it is desirable to provide a wall bracket for mounting bundles, such as cables, conduits or pipes that are easy and efficient to install. It is also desirable to provide a wall bracket that insures proper alignment when mounting the bundles of cables, conduits or pipes in a vertical direction or a horizontal direction.

SUMMARY OF THE INVENTION

The present invention is directed to a wall bracket that mounts bundles. The wall bracket includes a bundle side member and a wall side member. The bundle side member has a plurality of slots extending along the length of the bundle side member. The wall side member has a plurality of pockets extending along the length of the wall side member. The wall side member engages the bundle side member such that the pockets align with the plurality of slots. When it is desirable to secure a bundle to the wall bracket, a locking tie is thread in one slot, guided along the pocket and thread out a second slot to enable the locking tie to capture and secure the bundle.

DETAILED DESCRIPTION

Figure 1:
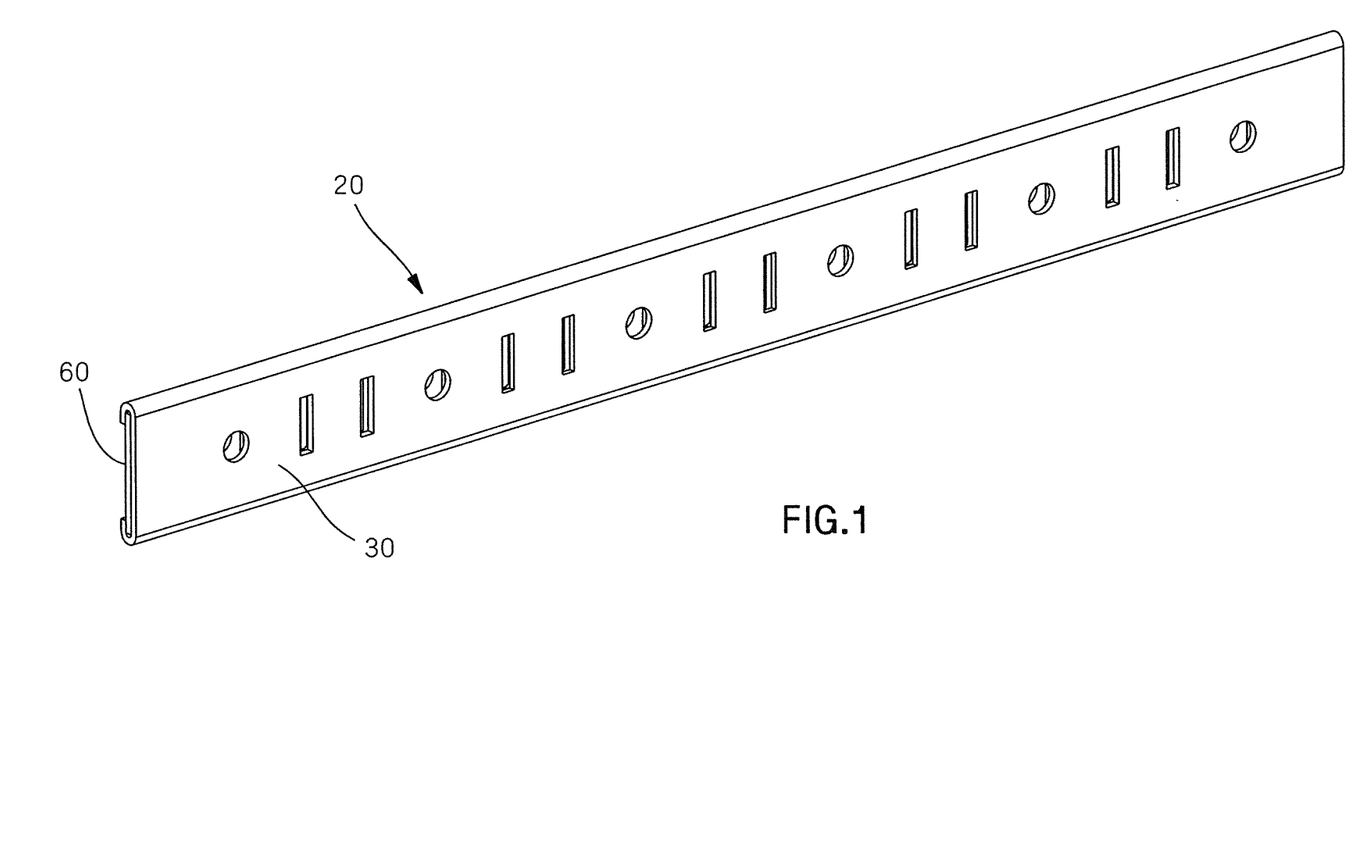
FIG. 1 is a front perspective view of the metal wall bracket of the present invention.

The present invention is directed to a metal wall bracket 20. As illustrated in FIG. 1, the metal wall bracket 20 includes a bundle side member 30 and a wall side member 60 (see FIGS. 4 and 5).

Figure 2:
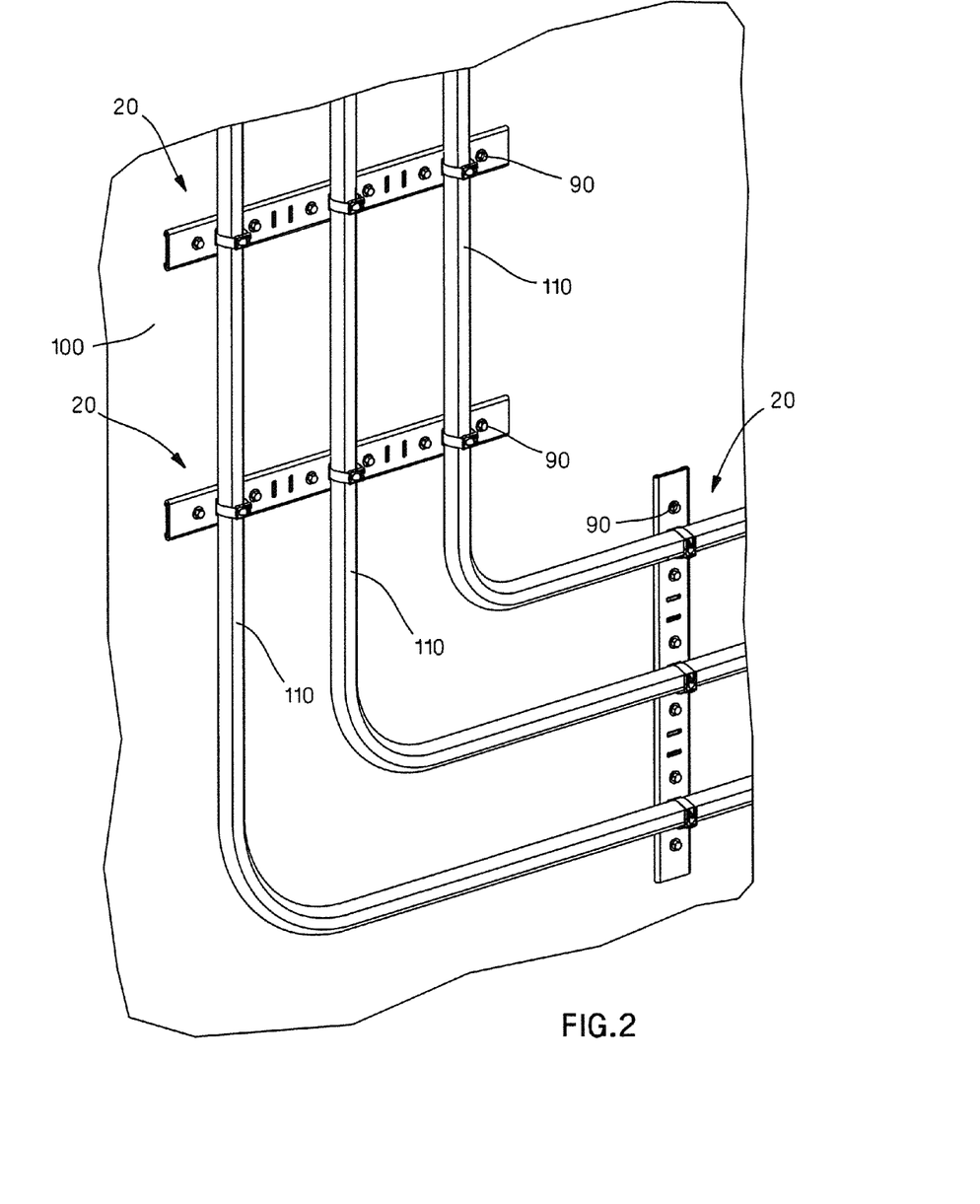
FIG. 2 is a front perspective view of a plurality of metal wall brackets of FIG. 1 installed on a wall with a plurality of bundles mounted thereto.
Figure 3:
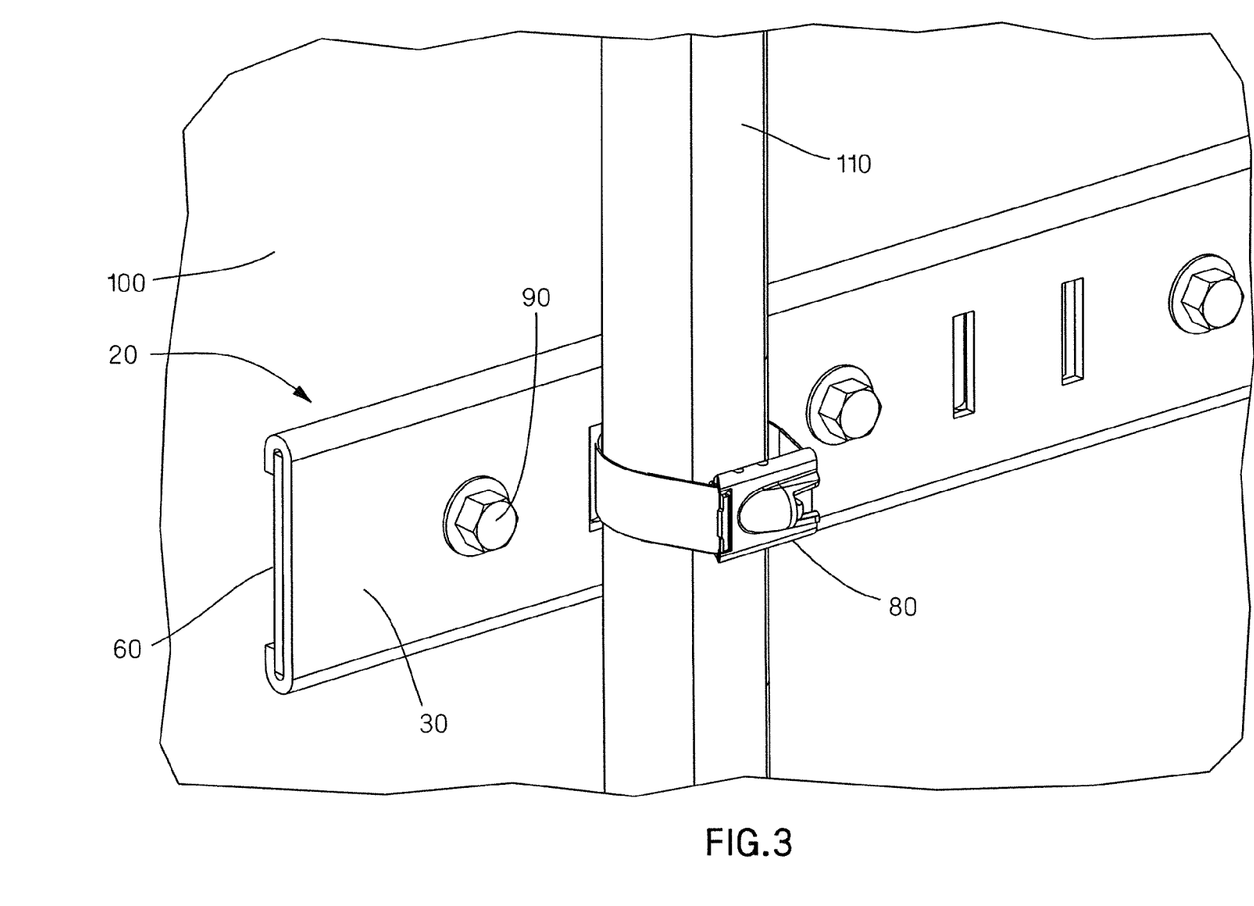
FIG. 3 is a front perspective view of a metal locking tie securing a bundle to the metal wall bracket of FIG. 2.
Figure 6:
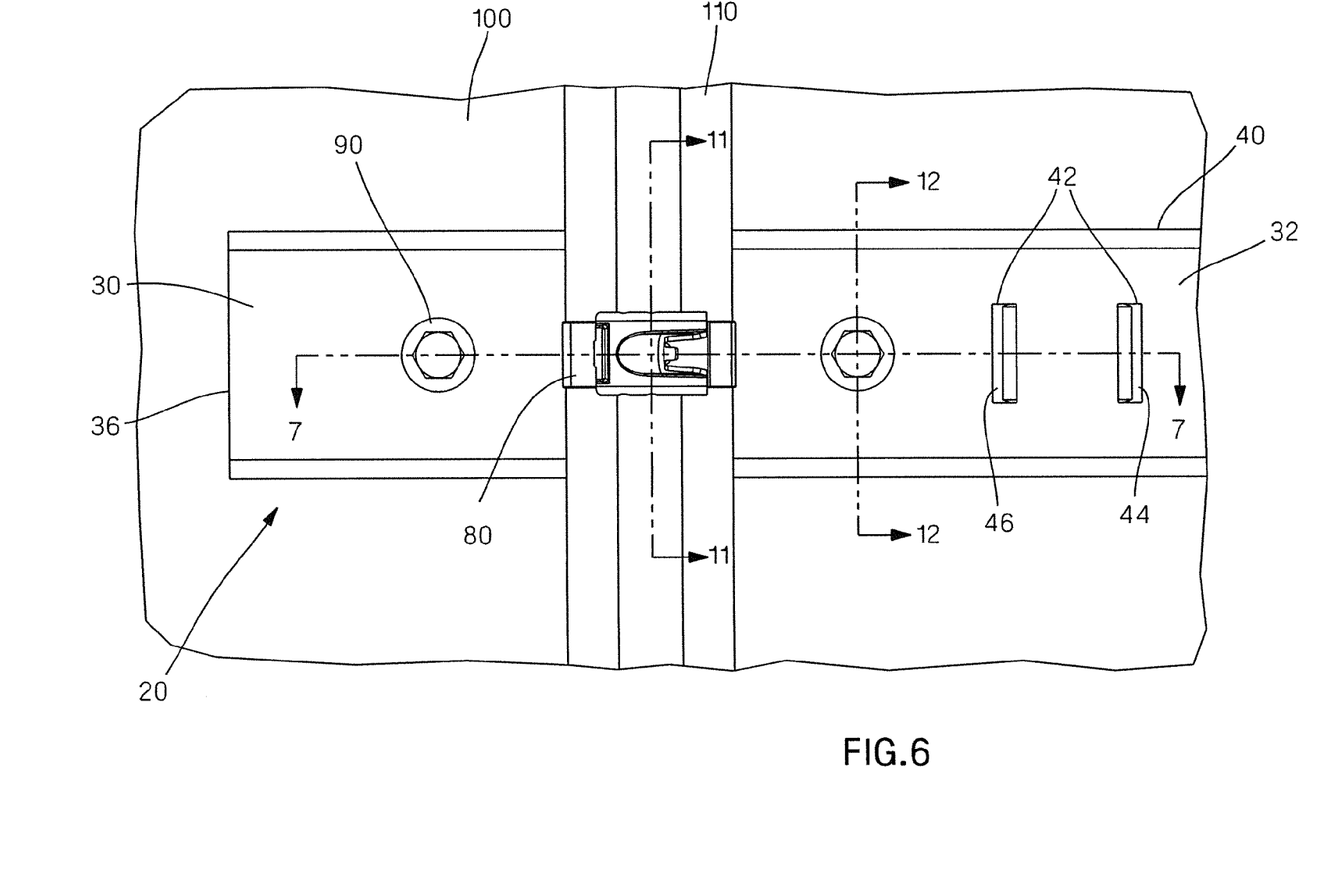
FIG. 6 is a top view of the metal locking tie securing a bundle to the metal wall bracket of FIG. 3.

As illustrated in FIG. 2, the metal wall bracket 20 may be mounted to a wall 100 in either a horizontal direction or a vertical direction. FIGS. 2, 3, and 6 illustrate metal wall brackets 20 secured to the wall 100 via wall bracket fasteners 90. As further illustrated in FIG. 2, the metal wall brackets 20 are aligned on the wall 100 to facilitate mounting bundles 110 in a horizontal or vertical direction, as desired. Thus, the alignment of the metal wall brackets 20 ensures alignment of the bundles, such as cables, conduits or pipes to be routed.

Figure 4:
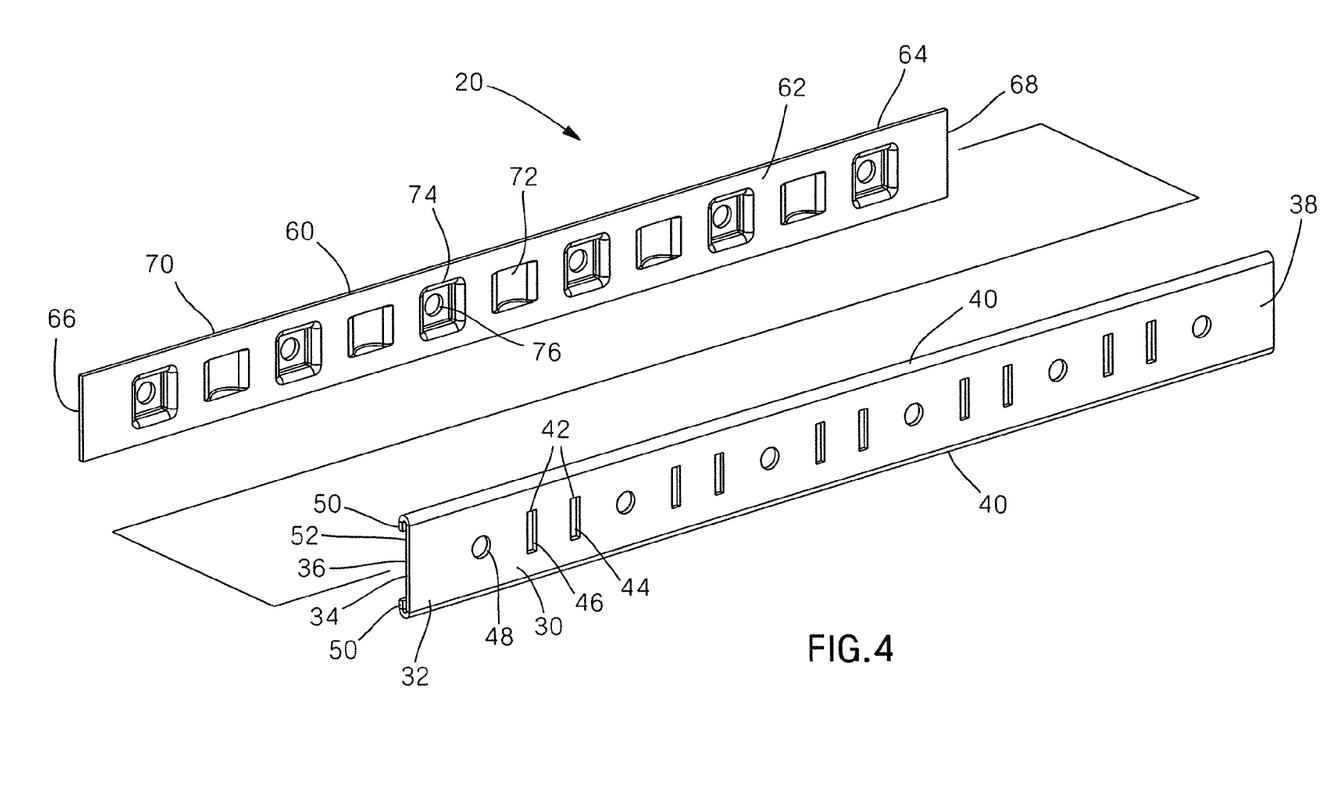
FIG. 4 is a front exploded view of the metal wall bracket of FIG. 1.
Figure 5:
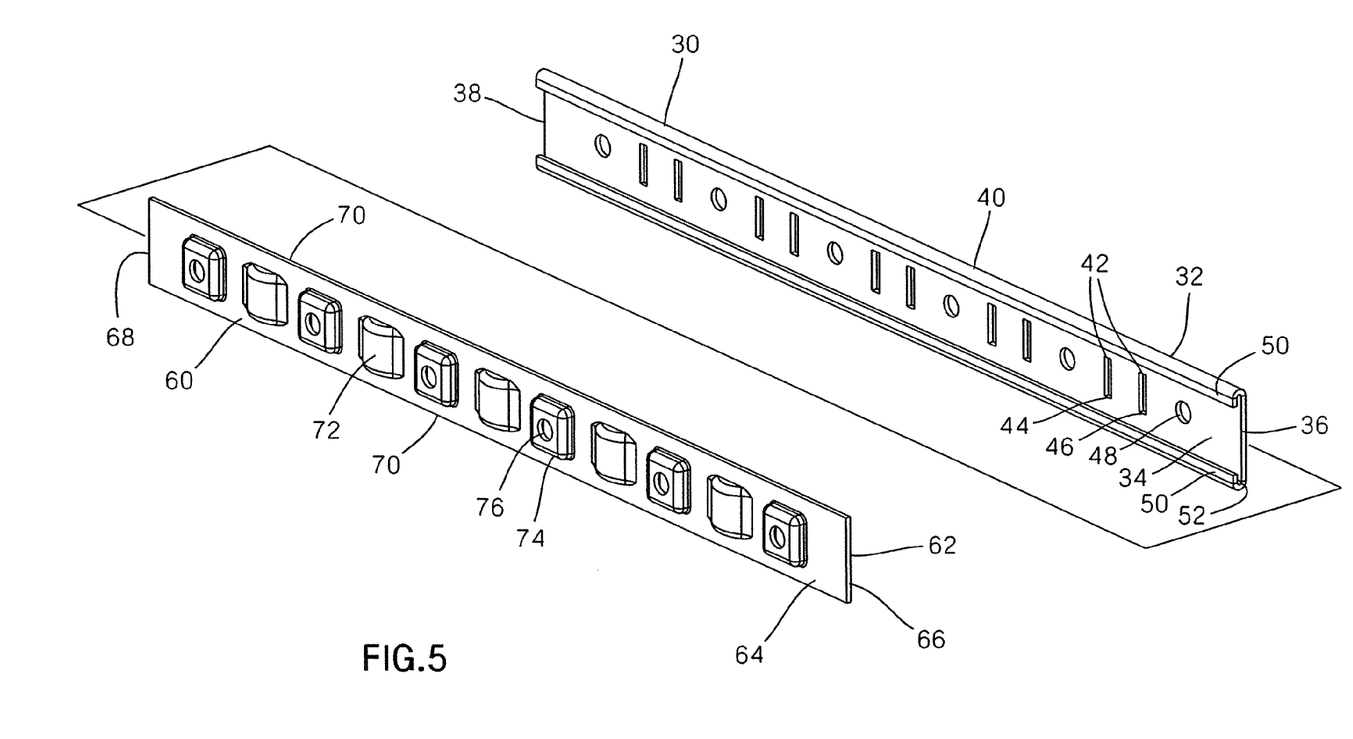
FIG. 5 is a rear exploded view of the metal wall bracket of FIG. 1.

FIGS. 4 and 5 illustrate the bundle side member 30 and a wall side member 60. The bundle side member 30 provides a surface that engages the bundles mounted to the bracket 20. The bundle side member 30 includes a front 32, a back 34, a first end 36, a second end 38, and sides 40. The bundle side member 30 includes a plurality of pre-punched slots 42. The pre-punched slots include entry slots 44 and exit slots 46 spaced to receive metal locking ties 80 (see FIG. 2).

The bundle side member 30 also includes a plurality of apertures 48 for receiving a plurality of wall bracket fasteners 90. The pre-punched slots 42 and apertures 48 could vary in distance, ratio, and size, if desired. The sides 40 of the bundle side member 30 include a curved flange 50 extending along the back 34 of the bundle side member 30 forming a channel 52 therebetween.

The wall side member 60 provides a surface that engages the wall 100 that the bracket 20 is mounted to. The wall side member 60 includes a front 62, a back 64, a first end 66, a second end 68, and sides 70. As illustrated in FIG. 1, the wall side member 60 is positioned within the channel 52 formed between the back 34 of the bundle side member 30 and the curved flanges 50. The wall side member 60 includes pockets 72 for guiding the metal locking ties 80 and fastener mounting hole pads 74. The pockets 72 and mounting hole pads 74 alternate to line up with the slots 42 and apertures 48 in the bundle side member 30 when the wall side member 60 is installed in the channel 52. The pockets 72 and fastener mounting hole pads 74 may also vary in distance, ratio, and size to complement the slots 42 and apertures 48 in the bundle side member 30.

Figure 7:
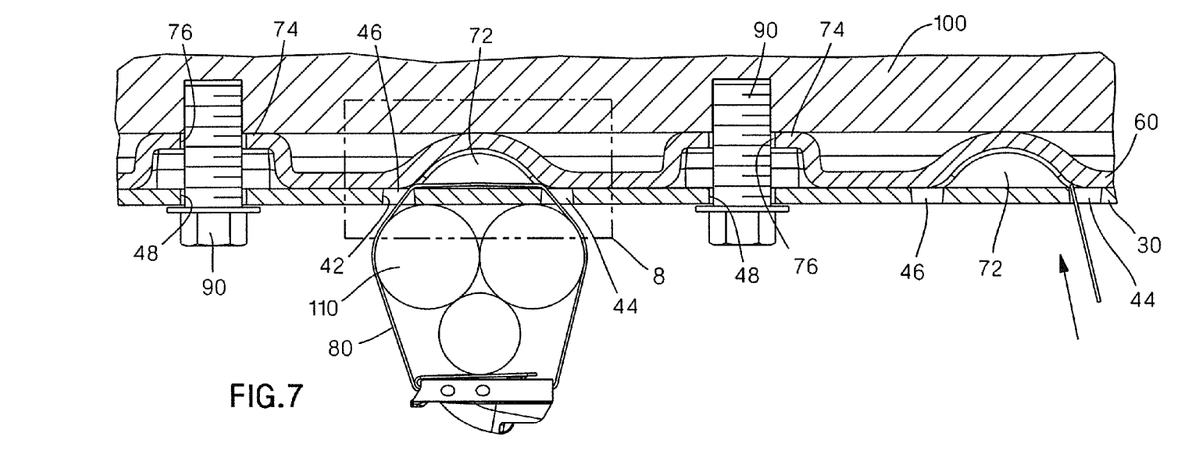
FIG. 7 is a cross sectional view of the metal locking tie securing a bundle to the metal wall bracket of FIG. 6 taken along line 7-7.
Figure 8:
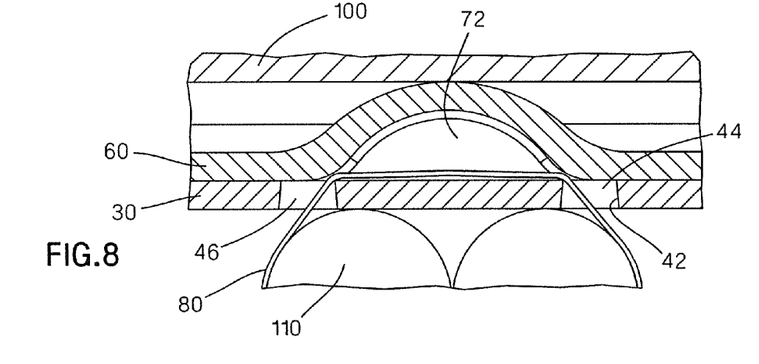
FIG. 8 is a partial sectional view of the metal locking tie securing a bundle to the metal wall bracket of FIG. 7.
Figure 9:
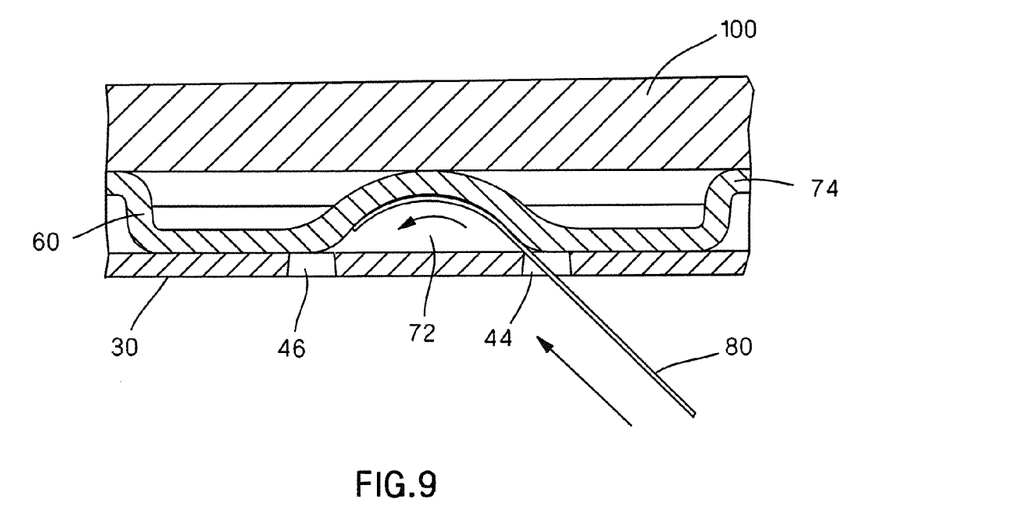
FIG. 9 is a sectional view of a metal locking tie partially installed in the metal wall bracket of FIG. 7.
Figure 10:
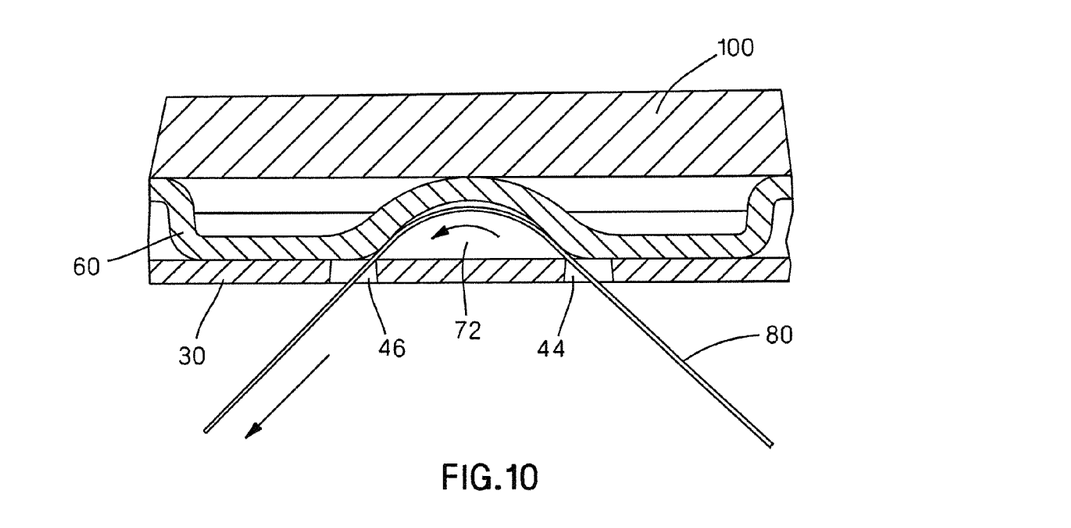
FIG. 10 is a sectional view of a metal locking tie installed in the metal wall bracket of FIG. 7 and positioned to receive a bundle.
Figure 11:
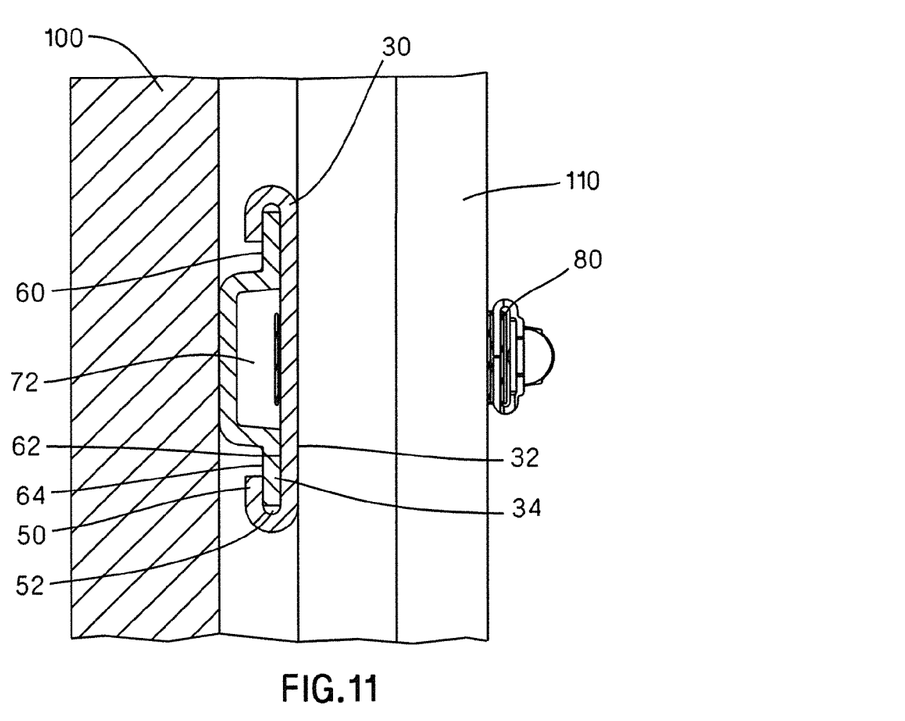
FIG. 11 is a cross sectional view of the metal locking tie securing a bundle to the metal wall bracket of FIG. 6 taken along line 11-11.
Figure 12:
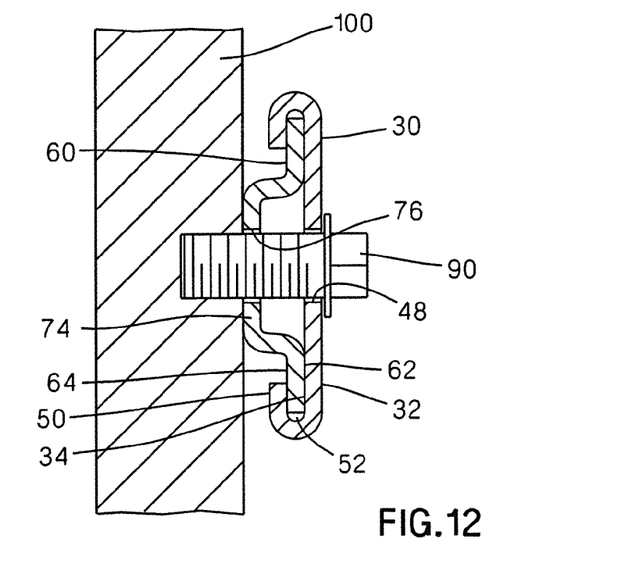
FIG. 12 is a cross sectional view of the wall bracket fastener securing the metal wall bracket to a wall of FIG. 6 taken along line 12-12.

As illustrated in FIGS. 6-12, the metal wall bracket 20 is secured to a wall 100 via the wall bracket fastener 90 (see FIG. 12) and a bundle 110 is mounted to the metal wall bracket 20 via a metal locking tie 80 (see FIG. 11). The mounting hole pads 74 include an aperture 76 for receiving the wall bracket fastener 90 extending through the bundle side member 30. As illustrated in FIGS. 7 and 12, the wall bracket fastener 90 extends through the aperture 48 in the bundle side member 30 and the aperture 76 in the mounting hole pad 74 into the wall 100. The mounting hole pads 74 are generally rectangular. The mounting hole pads 74 provide a stable interface when the wall mount bracket 20 is secured to a surface.

As illustrated in FIGS. 6, 7, and 11, a bundle 110 is secured on the metal wall bracket 20 mounted to the wall 100. To mount a second bundle, a metal locking tie 80 is inserted into an entrance slot 44 of the pre-punched slots 42 on the metal wall bracket 20 (see FIG. 7). The metal locking tie 80 is pushed into the entry slot 44 and along the semi-circular pocket 72 in the wall side member 60 (see FIG. 9). The pocket 72 guides the metal locking tie 80 to the adjacent exit slot 46 in the bundle side member 30. Once the metal locking tie 80 exits the pocket 72 through the exit slot 46 (see FIG. 10), the metal locking tie 80 can be threaded and locked to capture and secure a bundle in need of routing.

The metal wall bracket of the present invention mounts bundles efficiently compared to previous routing methods. The metal wall bracket enables the same size metal locking tie to be used for numerous sizes and types of bundles of cables, conduits, and pipes. The alignment of the metal wall brackets on the wall ensures alignment of the routed bundles unlike the traditional random location fastening systems that require alignment for every item added.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A two part wall bracket for mounting a bundle, the two part wall bracket comprising:
   a first part, wherein the first part is a bundle side member having a front, a back surface, a first end, a second end and sides extending from the first end to the second end defining a length of the bundle side member, each side having a curved flange extending along the length of the bundle side member forming a channel between the curved flanges and the back surface of the bundle side member, the bundle side member further having a plurality of slots for receiving a locking tie; and
   a second part removably connected to the first part, wherein the second part is a wall side member positioned within the channel of the bundle side member between the curved flanges and the back surface of the bundle side member, the wall side member engages the back surface of the bundle side member and the curved flanges engage a back surface of the wall side member, wherein the wall side member having a plurality of pockets aligned with the plurality of slots in the bundle side member;
   whereby the plurality of pockets guide the locking tie when installed in the slots to secure the bundle.

2. The two part bracket of claim 1, wherein the wall side member further comprising mounting hole pads, the mounting hole pads alternate with the pockets along a length of the wall side member.

3. The two part bracket of claim 2, wherein the bundle side member having a plurality of apertures; each mounting hole pad of the wall side member having an aperture, whereby the apertures in the bundle side member and the apertures in the wall side member align for receiving a fastener to mount the two part wall bracket.

4. A two part wall bracket for mounting a bundle, the two part wall bracket comprising:
   a first part, wherein the first part is a bundle side member having a front, a back surface, a first end, a second end and sides extending from the first end to the second end defining a length of the bundle side member, each side having a curved flange extending along the length of the bundle side member forming a channel between the curved flanges and the back surface of the bundle side member, the bundle side member further having a plurality of slots for receiving a locking tie; and
   a second part removably connected to the first part, wherein the second part is a wall side member positioned within the channel of the bundle side member between the curved flanges and the back surface of the bundle side member, the wall side member engages the back surface of the bundle side member and the curved flanges engage a back surface of the wall side member, wherein the wall side member having a plurality of pockets aligned with the plurality of slots in the bundle side member;
   wherein the plurality of slots in the bundle side member include entry slots spaced from exit slots, wherein the wall side member extends the length of the bundle side member with each pocket in the wall side member extending from one of the entry slots to one of the exit slots in the bundle side member;
   whereby the plurality of pockets guide the locking tie when installed in the slots to secure the bundle.

* * * * *